(12) United States Patent
Michel et al.

(10) Patent No.: US 9,182,474 B2
(45) Date of Patent: Nov. 10, 2015

(54) METHOD FOR LOCALIZING AN OBJECT

(71) Applicants: STMicroelectronics SA, Montrouge (FR); STMicroelectronics (Grenoble 2) SAS, Grenoble (FR)

(72) Inventors: Thierry Michel, Ste Agnes (FR); Bruno Paille, Engins (FR)

(73) Assignees: STMICROELECTRONICS S.A., Montrouge (FR); STMICROELECTRONICS (GRENOBLE 2) SAS, Grenoble (FR)

(*) Notice: Subject to any disclaimer, the term of this patent is extended or adjusted under 35 U.S.C. 154(b) by 356 days.

(21) Appl. No.: 13/768,707

(22) Filed: Feb. 15, 2013

(65) Prior Publication Data

US 2013/0214976 A1 Aug. 22, 2013

(30) Foreign Application Priority Data

Feb. 17, 2012 (FR) ...................... 12 51497

(51) Int. Cl.
| | |
|---|---|
| *G01S 1/24* | (2006.01) |
| *G01S 5/14* | (2006.01) |
| *G01S 5/02* | (2010.01) |
| *G01S 5/06* | (2006.01) |
| *H04B 1/707* | (2011.01) |

(52) U.S. Cl.
CPC ............... *G01S 5/14* (2013.01); *G01S 5/0221* (2013.01); *G01S 5/06* (2013.01); *H04B 1/707* (2013.01)

(58) Field of Classification Search
CPC ............ G01S 1/24; G01S 1/08; G01S 5/06; G01S 5/14; G01S 5/0221

USPC ................................................. 342/387, 386
See application file for complete search history.

(56) References Cited

U.S. PATENT DOCUMENTS

| | | | |
|---|---|---|---|
| 5,327,144 A | 7/1994 | Stilp et al. | |
| 5,890,068 A | 3/1999 | Fattouche et al. | |
| 6,665,332 B1 | 12/2003 | Carlson et al. | |
| 6,861,982 B2 * | 3/2005 | Forstrom et al. | ............. 342/387 |
| 6,891,815 B1 | 5/2005 | Song | |

(Continued)

FOREIGN PATENT DOCUMENTS

JP 2009150906 A * 7/2009

OTHER PUBLICATIONS

French Search Report, dates Nov. 9, 2012 for French application No. 1251497, 8 pages.

(Continued)

*Primary Examiner* — Harry Liu
(74) *Attorney, Agent, or Firm* — Seed IP Law Group PLLC

(57) ABSTRACT

A method for localizing an object, including the acts of: transmission of a first signal by a first transmitter assigned to the object and of a second signal by at least one second transmitter; reception of the first and of the second signal by at least three receivers; in each receiver and for the first and the second signal: a) generation of a first and of a second reference signal; b) correlation between the first signal and the first reference signal and between the second signal and the second reference signal; c) interpolation of samples resulting from the correlation; d) deduction of the propagation time of the first and of the second signal; e) calculation of the difference between the propagation times of the first and of the second signal; and, by triangulation, deduction of the position of the object.

27 Claims, 5 Drawing Sheets

(56) References Cited

U.S. PATENT DOCUMENTS

| | | |
|---|---|---|
| 2004/0002347 A1 | 1/2004 | Hoctor et al. |
| 2004/0178955 A1 | 9/2004 | Menache et al. |
| 2005/0001742 A1* | 1/2005 | Small .......................... 340/988 |
| 2010/0234048 A1* | 9/2010 | Duffett-Smith et al. ... 455/456.6 |

OTHER PUBLICATIONS

Shwarzer et al., "Precise distance measurement with IEEE 802.15.4 (ZigBee) devices" Proc IEEE Radio Wireless Symp (RWS'08), Jan. 22-24, 2008, pp. 779-782.

* cited by examiner

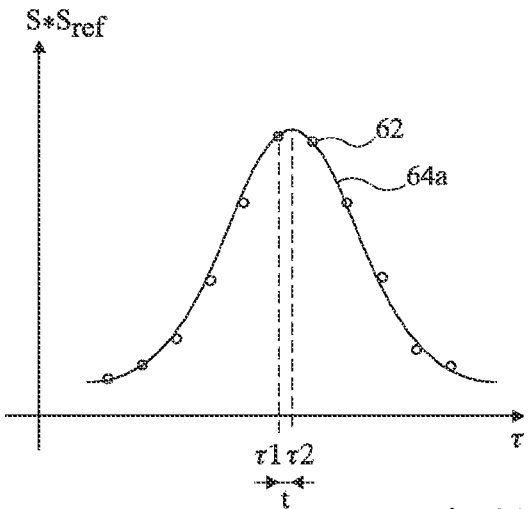
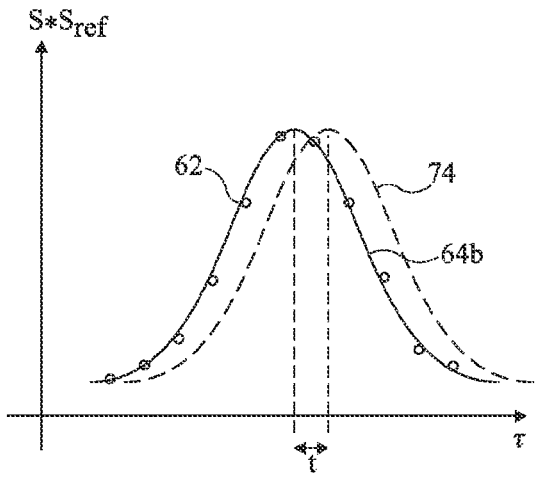
Fig 4A
Fig 4B
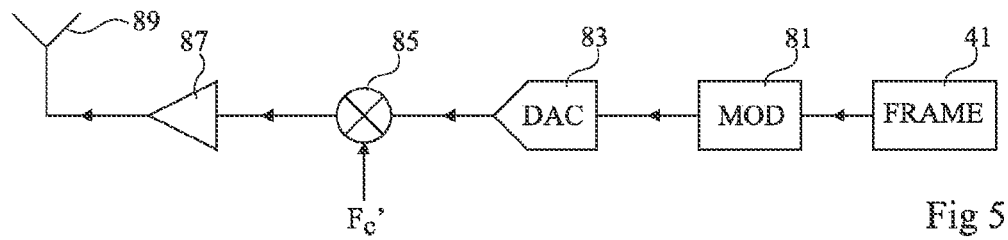
Fig 5
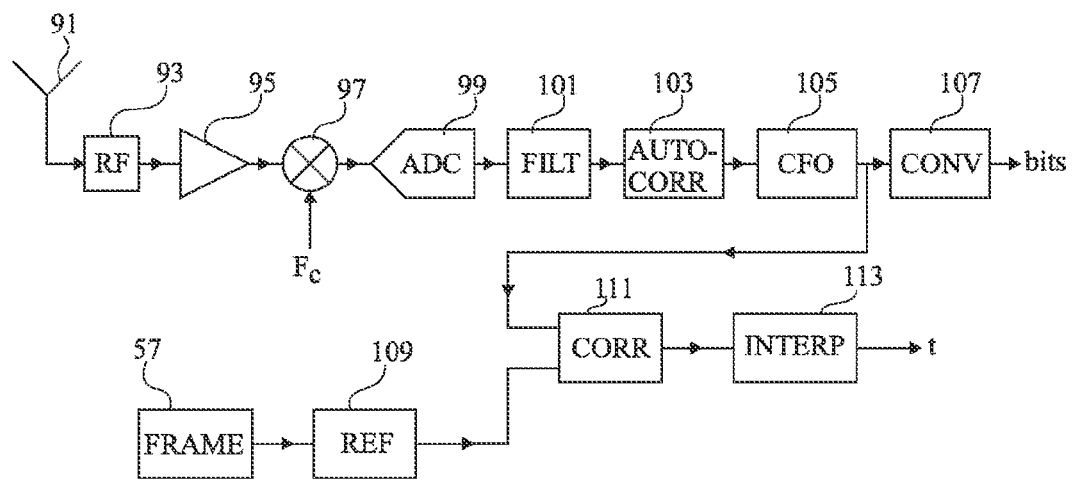
Fig 6A

METHOD FOR LOCALIZING AN OBJECT

BACKGROUND

1. Technical Field

The present disclosure relates to the localization of an object belonging to a network of objects communicating together by radio transmission. The present disclosure more specifically relates to low-cost and low-consumption wireless sensor networks using short-range radio transmissions such as ZigBee wireless communication protocols based on standard IEEE 802.15.4.

2. Description of the Related Art

To determine the position of an object belonging to a network of objects communicating together by radio transmission, a solution is to use a triangulation technique associated with signal propagation time measurements.

In low-cost and low-consumption wireless sensor networks, receivers comprise analog-to-digital converters operating at low sampling frequencies, which limits the accuracy of the determination of propagation times, and thus of the position of the object.

A method to more accurately localize an object belonging to a network of objects communicating together by radio transmission is desired.

BRIEF SUMMARY

An embodiment provides a method for localizing an object, comprising: transmission by a first emitter assigned to the object of a first signal from a first frame, and transmission by at least one second transmitter of a second signal from a second frame, said first and second frames comprising a common portion; reception of the first and of the second signal by at least three receivers; in each receiver and for the first and the second signal: a) generation of a first reference signal from a third frame and of a second reference signal from a fourth frame, the third and fourth frames comprising said common portion; b) correlation between the first signal and the first reference signal and between the second signal and the second reference signal; c) interpolation of samples resulting from the correlation; d) deduction of the propagation time of the first and of the second signal; e) calculation of the difference between the propagation times of the first and of the second signal; and, by triangulation, deduction of the position of the object.

According to an embodiment, at c), the interpolation is obtained from a comparison between the samples resulting from the correlation and other samples resulting from an interpolation of other samples resulting from the auto-correlation of the reference signal corresponding to the considered signal.

According to an embodiment, the third and fourth frames are respectively selected according to the first and second frames.

According to an embodiment, the third frame is identical to the first frame and the fourth frame is identical to the second frame.

According to an embodiment, the triangulation is performed in a calculation unit associated with the second transmitter.

According to an embodiment, the common portion of each frame corresponds to their data sequence.

Another embodiment provides a system for localizing an object, comprising: a first transmitter assigned to the object, capable of transmitting a first signal from a first frame, and at least one second transmitter capable of transmitting a second signal from a second frame, said first and second frames comprising a common portion; at least three receivers capable of receiving the first and the second signal, each receiver comprising: a) a first element for generating a first reference signal from a third frame and a second reference signal from a fourth frame, the third and fourth frames comprising said common portion; b) a second element for calculating the correlation between the first signal and the first reference signal and between the second signal and the second reference signal; c) a third element for calculating an interpolation of samples resulting from the correlation between the first signal and the first reference signal and of samples resulting from the correlation between the second signal and the second reference signal, and for deducing the propagation time of the first and of the second signal; and d) a fourth element for calculating the difference between the propagation times of the first and of the second signal; and a calculation unit capable of deducing the position of the object by triangulation, based on the differences between the propagation times of the first and of the second signal provided by each receiver.

According to an embodiment, for each receiver, the third element comprises: a fifth element for calculating the auto-correlation of the first reference signal corresponding to the first signal and of the second reference signal corresponding to the second signal; a sixth element for calculating an interpolation of samples resulting from the auto-correlation of the first reference signal and of samples resulting from the auto-correlation of the second reference signal; and a seventh element for comparing, for the first and the second signal, samples resulting from the correlation calculated in the second element and samples resulting from the interpolation calculated in the sixth element.

According to an embodiment, the calculation unit capable of deducing the position of the object is comprised in the second transmitter.

The foregoing and other features and advantages will be discussed in detail in the following non-limiting description of specific embodiments in connection with the accompanying drawings.

BRIEF DESCRIPTION OF THE SEVERAL VIEWS OF THE DRAWINGS

Non-limiting and non-exhaustive embodiments are described with reference to the following drawings, wherein like labels refer to like parts throughout the various views unless otherwise specified. The sizes and relative positions of elements in the drawings are not necessarily drawn to scale. For example, the shapes of various elements and angles are not drawn to scale, and some of these elements are enlarged and positioned to improve drawing legibility. Further, the particular shapes of the elements as drawn are not intended to convey any information regarding the actual shape of the particular elements and have been selected for ease of recognition in the drawings. One or more embodiments are described hereinafter with reference to the accompanying drawings in which:

FIG. 4A illustrates an act of the method for determining the propagation time of a signal of FIG. 3A;

FIG. 4B illustrates an act of the method for determining the propagation time of a signal of FIG. 3B;

FIG. 5 is a block diagram illustrating a transmit circuit of a radio transmitter;

FIGS. 6A and 6B are block diagrams illustrating receive circuits of a radio receiver capable of determining the propagation time of a signal according to the methods of FIGS. 3A and 3B.

DETAILED DESCRIPTION

Figure 1:
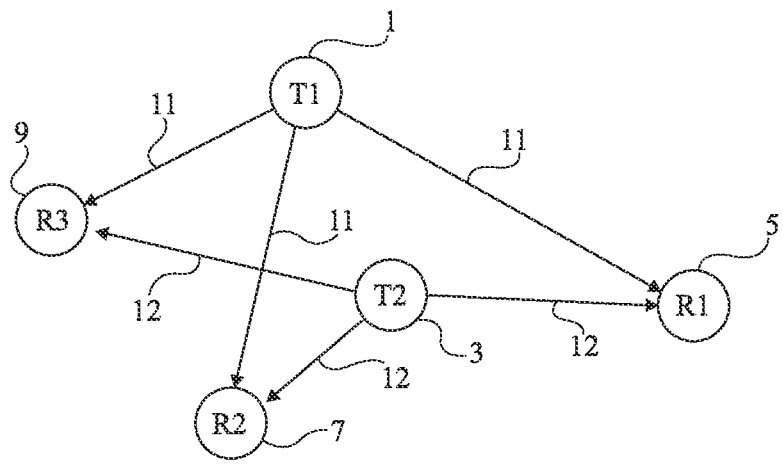
FIG. 1 is a diagram illustrating the implementation of a triangulation technique based on signal propagation times to localize an object of a wireless communication network.

The same elements have been designated with the same reference numerals in the different drawings. For clarity, only those acts and elements which are useful to the understanding of the discussed embodiments have been detailed. In particular, the nature of the transmitted data has not been detailed, the described embodiments being compatible with data currently transmitted in such systems. Further, the structure of the transmit and receive circuits has not been detailed, it being here again compatible with usual circuits.

FIG. 1 is a diagram illustrating the implementation of a triangulation technique to localize an object of a network of objects communicating together by radio transmission.

The network of objects comprises two radio transmitters T1 and T2 and three radio receivers R1, R2, and R3. The position of the three receivers is fixed and known. One of the two transmitters, for example, transmitter T1, corresponds to the object to be localized. The position of the other transmitter, for example, transmitter T2, is known.

Each transmitter T1, T2 transmits a specific signal, called localization signal, which is received by each receiver. Call 11 the signal transmitted by transmitter T1, and 12 the signal transmitted by transmitter T2. Each receiver R1, R2, R3 determines the propagation time of the two signals 11, 12, that is, the time taken by signal 11, 12 to propagate from transmitter T1, T2 to the receiver. Each receiver then calculates the difference between the propagation time of signal 11 and that of signal 12, and then the corresponding distance. The position of the object associated with transmitter T1 is deduced by triangulation. The triangulation may for example be performed by a calculation unit associated with transmitter T2, or by a calculation unit associated with another object of the network (not shown), or by a calculation unit external to the network.

Figure 2:
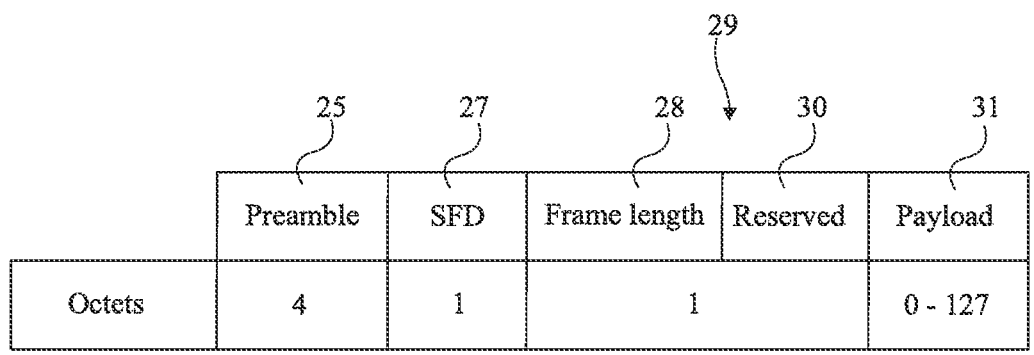
FIG. 2 is a table diagram of a frame used in the ZigBee standard.

FIG. 2 shows a frame corresponding to standard IEEE 802.15.4 (ZigBee). The frame starts with a preamble 25 formed of 4 bytes, followed by a sequence 27 (SFD—Start Frame Delimiter) of one byte intended to indicate the end of the preamble. The next one-byte sequence 29 comprises a portion 28 (Frame length) intended to indicate the length of the frame data, and another portion 30 (Reserved) intended to contain specific data depending on the application. The last sequence 31 (Payload) of the frame contains the data to be transmitted. Data sequence 31 may comprise up to 127 bytes.

Figure 3A:
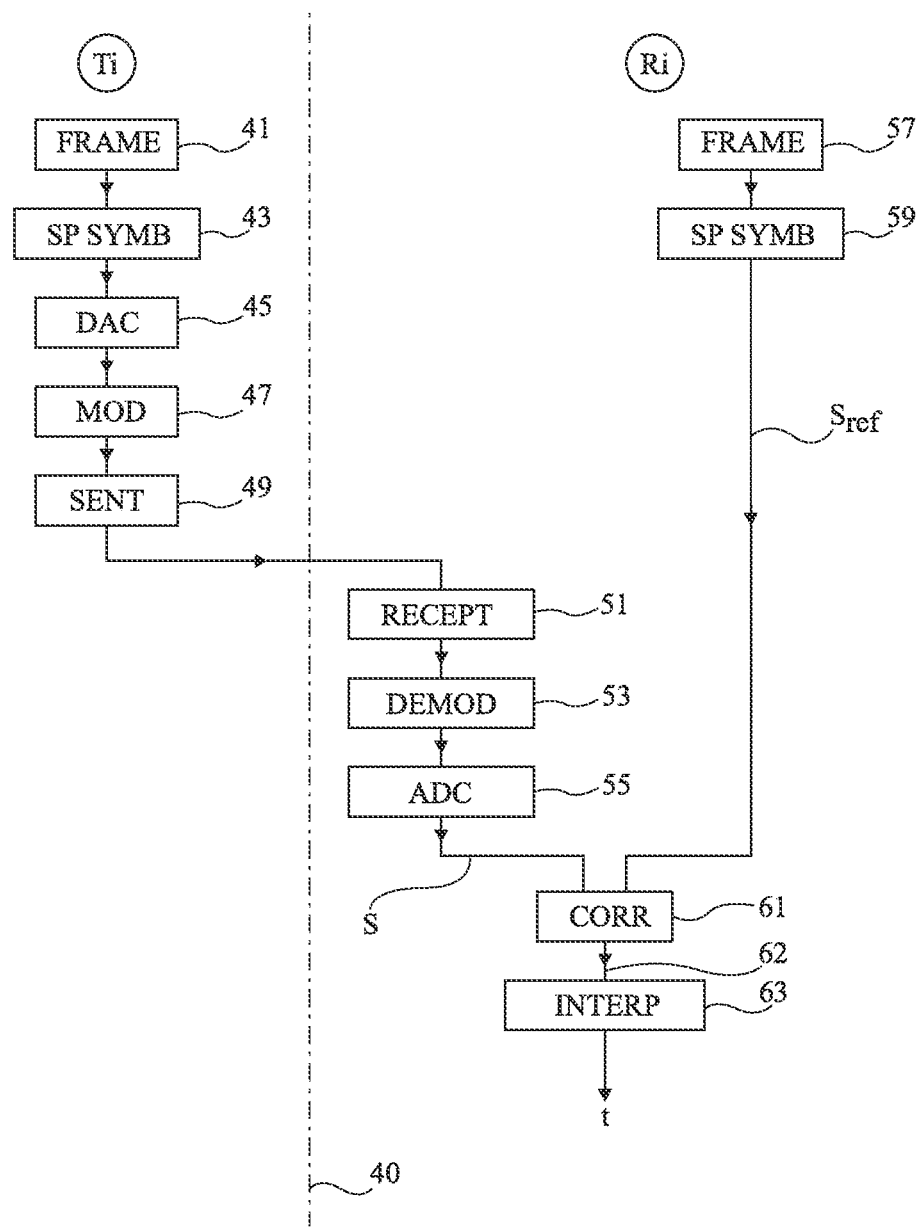
FIG. 3A is a diagram illustrating a method for determining the propagation time of a signal between a transmitter and a receiver.

FIG. 3A is a diagram illustrating successive acts of a method for determining the propagation time of a localization signal transmitted by a transmitter Ti and received by a receiver Ri. Transmitter Ti for example corresponds to transmitter T1 or to transmitter T2 of FIG. 1, and receiver Ri for example corresponds to one of receivers R1, R2, or R3. The method acts, which are carried out in transmitter Ti, are shown to the left of vertical stripe-dot line 40, while the method acts, which are performed in receiver Ri, are shown to the right of line 40.

A frame 41 (FRAME) of the type illustrated in FIG. 2 is used by transmitter Ti to generate a localization signal and sent to receiver Ri. In the following description, such a frame is called localization frame. In a localization frame, data sequence 31 (FIG. 2) is specific and enables all the receivers to identify the frame as a localization frame. Any object of the network shares the same data sequence 31. Further, in a localization frame, sequence 30 contains the MAC address ("Media Access Control") of the transmitter. It enables the receiver to identify the transmitter which has transmitted the localization signal.

Localization frame 41 is submitted to a so-called spread spectrum processing (act 43, SP SYMB). Such a processing comprises modifying any transmitted data by applying a spread spectrum code thereto. This act gives the localization signal properties of auto-correlation (correlation of the signal with itself without requiring a reference signal) identical to those of preamble 25, and repeats this localization signal several times in the same frame. In the case where the used standard provides no spread spectrum code, the preamble can itself be used as a localization signal. The repeating of the localization signal is then performed by the sending of a larger number of localization frames.

After the spectrum spreading, the localization frame is converted into an analog signal (act 45, DAC—Digital-to-Analog Converter). The analog signal is then modulated (act 47, MOD) and sent to receiver Ri (act 49, SENT). The modulation may be performed before the digital-to-analog conversion.

The analog signal received by receiver Ri (act 51, RECEPT) is demodulated (act 53, DEMOD), and then converted into a digital signal (act 55, ADC—Analog-to-Digital Converter). The demodulation may be performed after the analog-to-digital conversion.

Concurrently, from another localization frame 57 (FRAME) having undergone a spread spectrum processing (act 59, SP SYMB), a reference signal $S_{ref}$ is generated in receiver Ri.

Localization frames 41 and 57 comprise a common portion formed by their specific data sequence 31. Localization frames 41 and 57 may be identical.

In receiver Ri, correlation 61 (CORR) between localization signal S transmitted by transmitter Ti and reference signal $S_{ref}$ generated in receiver Ri is then calculated. Such a correlation is usually difficult to use for localization purposes, since the localization signal and the reference signal are generally periodic. It is here made possible due to spread spectrum acts 43 and 59.

It could have been devised to determine the propagation time of the localization signal between transmitter Ti and receiver Ri from samples resulting from the correlation. However, the time resolution for the propagation time determination depends on the sampling frequency of the analog-to-digital conversion of the localization signal in receiver Ri at act 55. In low-cost and low-consumption wireless sensor networks, the receivers comprise analog-to-digital converters operating at low sampling frequencies, for example, on the order of 12 MHz. The accuracy of the distance determination based on the propagation times then is approximately 25 m. In the case where an object is desired to be localized around a building or in a building, the position of the object then cannot be determined with a sufficient accuracy.

To improve the time resolution of the propagation time determination, and thus the accuracy of the determination of the position of the object, the present inventors provide carrying out an additional act of interpolation 63 of samples 62 resulting from correlation 61 between localization signal S and reference signal $S_{ref}$. Propagation time t is provided by block 63.

FIG. 4A illustrates the determination of propagation time t based on interpolation 63 (FIG. 3A) of samples 62 resulting from correlation 61. Samples 62 resulting from correlation $S*S_{ref}$ between localization signal S transmitted by transmitter Ti and reference signal $S_{ref}$ generated in receiver Ri are shown according to time τ at which the correlation is performed. Curve 64a illustrates an interpolation of samples 62. Call $τ_1$ time τ of the sample for which the correlation is at or near maximum. Call $τ_2$ time τ for which interpolation 64a of samples 62 is at or near maximum. Propagation time t corresponds to the difference in absolute value between times $τ_1$ and $τ_2$.

Figure 3B:
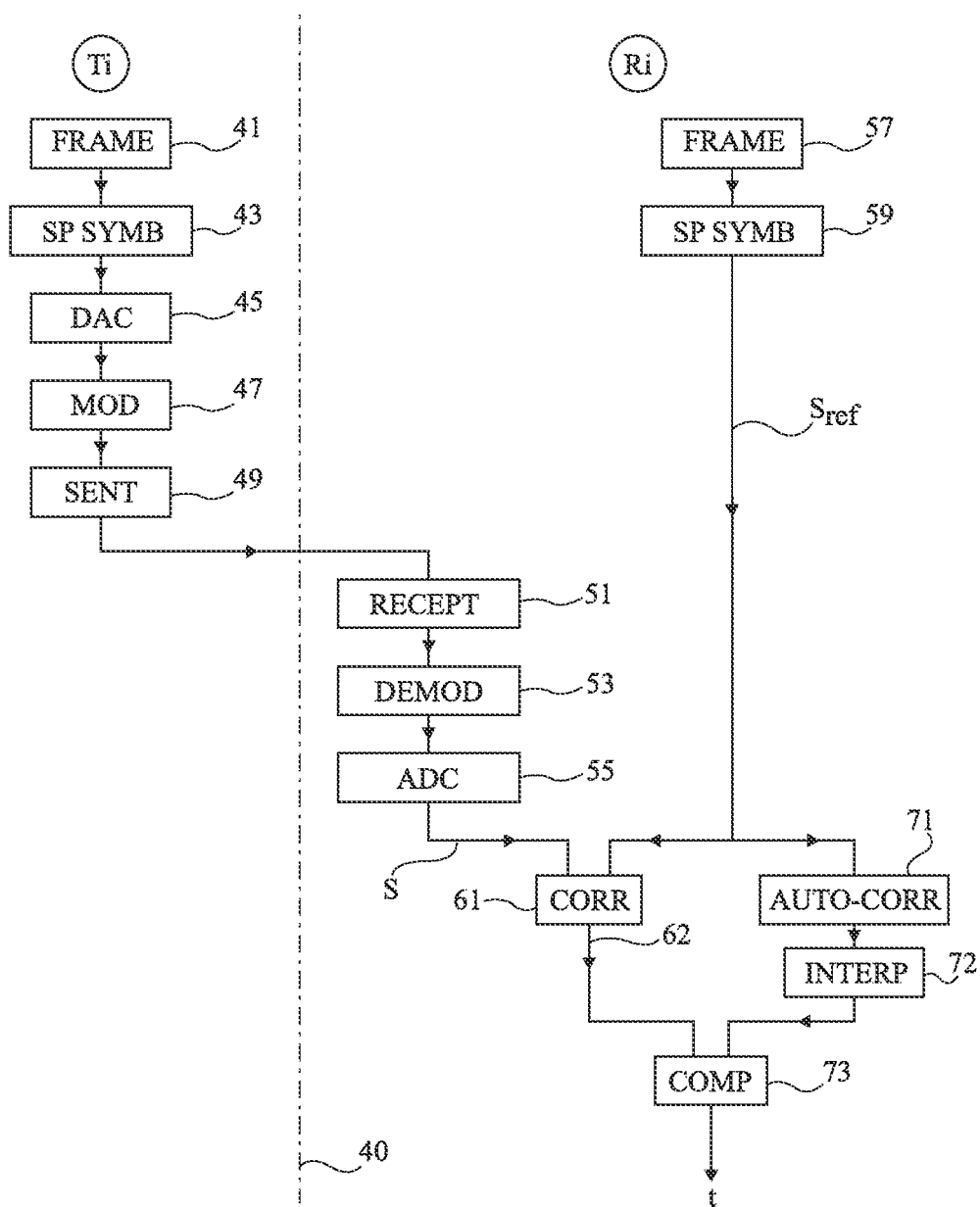
FIG. 3B is a diagram illustrating a variation of the method illustrated in FIG. 3A.

FIG. 3B is a diagram illustrating successive acts of a variation of the method for determining the propagation time of a localization signal transmitted by a transmitter Ti and received by a receiver Ri illustrated in FIG. 3A. Only those elements different from those of the method illustrated in FIG. 3A are described hereafter.

As for the method described in relation with FIG. 3A, in receiver Ri, the correlation between localization signal S transmitted by transmitter Ti and reference signal $S_{ref}$ generated in receiver Ri is calculated (act 61, CORR). To determine propagation time t of the localization signal between transmitter Ti and receiver Ri, the method illustrated in FIG. 3B uses a so-called indirect method of interpolation of samples 62 resulting from correlation 61 between localization signal S and reference signal $S_{ref}$.

To achieve this, concurrent to the calculation of the correlation between localization signal S and reference signal $S_{ref}$, in receiver Ri, the auto-correlation of reference signal $S_{ref}$ is calculated (act 71, AUTO-CORR), after which an interpolation of samples resulting from the auto-correlation of the reference signal is determined (act 72, INTERP). Samples 62 resulting from correlation 61 are then compared, in receiver Ri, with samples resulting from interpolation 72 of auto-correlation 71 of the reference signal (act 73, COMP).

FIG. 4B illustrates the determination of propagation time t based on the method of interpolation of samples 62 resulting from correlation 61 described in relation with FIG. 3B. Samples 62 resulting from correlation $S*S_{ref}$ between localization signal S transmitted by transmitter Ti and reference signal $S_{ref}$ generated in receiver Ri are shown according to time τ at which the correlation is performed. Curve 74 shows an interpolation of samples resulting from the auto-correlation of reference signal $S_{ref}$. Curve 64b shows an interpolation of samples 62. Curve 64b is obtained from curve 74 by shifting it along the time axis to minimize the mean quadratic error between samples 62 and the samples resulting from interpolation 74 at the same times τ. The time shift (in absolute value) between curves 74 and 64b corresponds to propagation time τ.

The method described in relation with FIGS. 3B and 4B may be preferred, for example, in the case where it is simpler to perform an interpolation of the samples resulting from the auto-correlation of the reference signal than a direct interpolation of the samples resulting from the correlation between the localization signal and the reference signal. Such is for example the case when the signal-to-noise ratio of the localization signal is low.

FIG. 5 is a block diagram illustrating an example of a transmit circuit of a radio transmitter Ti for example corresponding to transmitter T1 or to transmitter T2 of FIG. 1 and capable of being used to send a localization signal. The transmit circuit is intended for the implementation of acts 41 to 49 of a method of the type described in relation with FIGS. 3A and 3B.

The transmit circuit comprises a digital modulator 81 (MOD) intended to receive a localization frame 41 as an input. The output of digital modulator 81 is connected to the input of a digital-to-analog converter 83 (DAC). The output of converter 83 is connected to the input of an analog modulator 85. Modulator 85 is intended to multiply the analog signal containing the data, obtained at the output of converter 83, by a periodic signal of carrier frequency $F_c'$. Modulator 85 is connected to an amplifier 87 intended to increase the amplitude of the envelope of the localization signal. Amplifier 87 is connected to an antenna 89 intended to send the localization signal.

FIG. 6A is a block diagram illustrating an example of a receive circuit of a radio receiver Ri, for example corresponding to receivers R1, R2, or R3 of FIG. 1 and capable of being used to receive a localization signal transmitted by a transmitter Ti and to determine its propagation time. The receive circuit is intended for the implementation of acts 51 to 63 of a method of the type illustrated in FIG. 3A.

An antenna 91, intended to receive the localization signal, is connected to the input of an amplifier 95. A radio frequency stage 93 (RF) may be arranged between antenna 91 and amplifier 95. The output of amplifier 95 is connected to the input of a demodulator 97. Demodulator 97 is intended to separate the analog signal containing the data from the envelope used for the transmission, by multiplying the localization signal by another periodic signal of carrier frequency $F_c$. The output of demodulator 97 is connected to the input of an analog-to-digital converter 99 (ADC). The output of converter 99 is connected to the input of a filter 101. Filter 101 is connected to an element 105 (CFO, "Carrier Frequency Offset") for calculating the offset between carrier frequencies $F_c$ and $F_c'$. Calculation element 105 is connected to a converter 107 (CONV). Converter 107 is intended to convert in the form of bits the digital signal obtained at the output of converter 99. In the shown example, means for calculating the auto-correlation of the localization signals are arranged between filter 101 and carrier frequency offset calculation element 105.

Above-described elements 91 to 107 are elements currently used in receive circuits of a radio receiver. They implement conventional acts 51 to 55 of reception and processing of the localization signal of a method of the type described in relation with FIG. 3A. In practice, and usually, the digital signals are signals in the form of complex numbers, comprising two components generally noted I (in phase) and Q (in quadrature).

The receive circuit further comprises elements 109, 111, and 113 for determining the propagation time of the localization signal received by the receiver. These elements implement acts 59 to 63 of a method of the type illustrated in FIG. 3A. They comprise a generator 109 (REF) intended to generate a reference signal from a localization frame 57. The output of generator 109 is connected to an input of a calculation element 111 (CORR). Another input of calculation element 111 is connected to the output of carrier frequency offset calculation element 105. Calculation element 111 is intended to calculate the correlation between the reference signal obtained at the output of generator 109 and the localization signal obtained at the output of calculation element 105. A calculation element 113 (INTERP) is connected to the output of calculation element 111. Calculation element 113 is intended to calculate an interpolation of samples resulting from the correlation provided by calculation element 111.

Calculation elements 111 and 113 are for example different units of a same calculation unit integrated in the receiver.

Figure 6B:
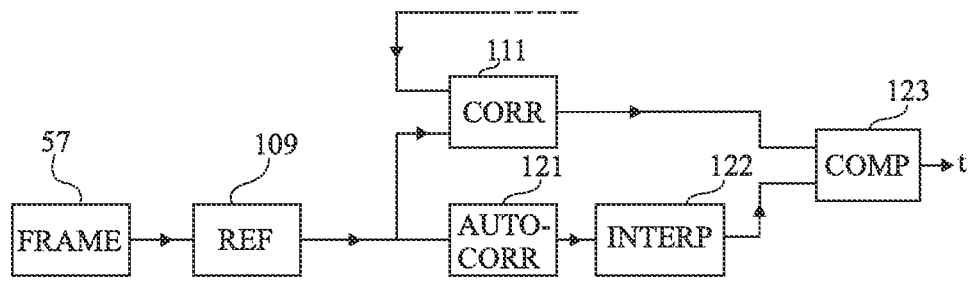

FIG. 6B is a block diagram illustrating a variation of the receive circuit illustrated in FIG. 6A. The receive circuit illustrated in FIG. 6B is intended for the implementation of acts 51 to 73 of a method of the type illustrated in FIG. 3B. Only those elements provided to determine the propagation time of the localization signal received by the receiver are shown in FIG. 6B.

Like the circuit illustrated in FIG. 6A, the circuit illustrated in FIG. 6B comprises an element 111 (CORR) for calculating the correlation between the reference signal obtained at the output of generator 109 and the localization signal obtained at the output of calculation element 105. The circuit further comprises an element 121 (AUTO-CORR) for calculating the auto-correlation of the reference signal obtained at the output of generator 109. A calculation element 122 (INTERP) is connected to the output of calculation element 121. Calculation element 122 is intended to calculate an interpolation of samples resulting from the auto-correlation of the reference signal provided by calculation element 121. The output of calculation element 122 is connected to an input of a comparator 123 (COMP). Another input of comparator 123 is connected to the output of calculation element 111. Comparator 123 is intended for the implementation of act 73 of a method of the type described in relation with FIG. 3B. Elements 111, 121, 122, and 123 for example are different modules of a same integrated calculation unit in the receiver.

Figure 7:
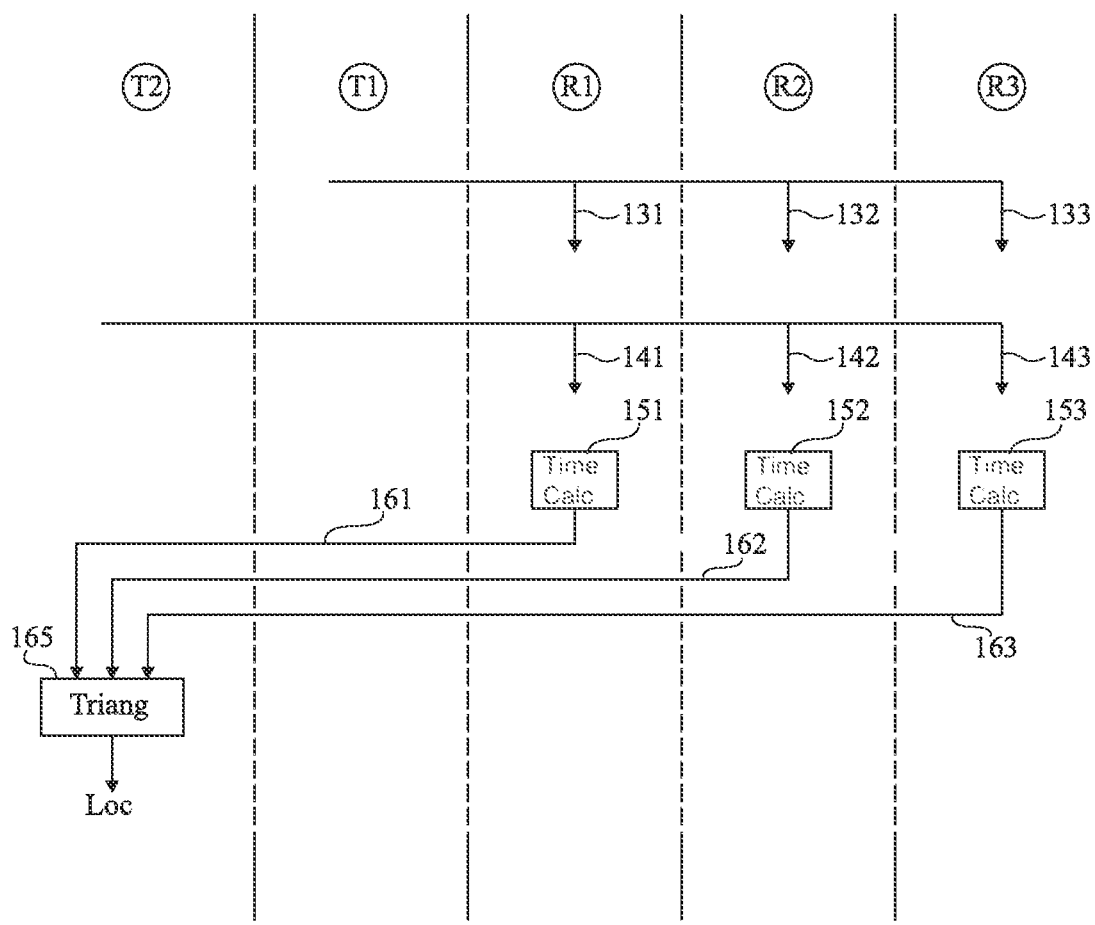
FIG. 7 is a diagram illustrating the operation of a system for localizing an object.

FIG. 7 is a diagram illustrating the operation of a system for localizing an object, corresponding to the diagram illustrated in FIG. 1 and using a method for determining the propagation time of localization signals of the type illustrated in FIG. 3A or 3B.

A transmitter T1 assigned to the object to be located sends a localization signal from a localization frame (acts 41 to 49). The signal transmitted by transmitter T1 is detected by receiver R1 (signal 131), by receiver R2 (signal 132), and by receiver R3 (signal 133). A transmitter T2 sends another localization signal from another localization frame (acts 41 to 49). The signal transmitted by transmitter T2 is detected by receiver R1 (signal 141), by receiver R2 (signal 142), and by receiver R3 (signal 143). It is not necessary to accurately know the delay between the transmission of the signal transmitted by transmitter T1 and the transmission of the signal transmitted by transmitter T2. The times of transmission of the signal transmitted by transmitter T1 and of the signal transmitted by transmitter T2 will be assigned by the tools of the network layer currently used to avoid collisions. Transmitter T1 and transmitter T2 may for example be assigned successive transmission times.

After the reception of the localization signal transmitted by transmitter T1 and of the localization signal transmitted by transmitter T2 and the processing (acts 51, 53, 55) in each receiver R1, R2, R3, the propagation times of the signal transmitted by transmitter T1 and of the signal transmitted by transmitter T2 are determined (acts 57 to 63 or 57 to 73). Reference numerals 151, 152, and 153 are used to designate the blocks, respectively corresponding to receivers R1, R2, and R3, where the propagation times of the signal transmitted by transmitter T1 and of the signal transmitted by transmitter T2 are determined.

To determine the propagation time of the signal transmitted by transmitter T1 and that of the signal transmitted by transmitter T2, in each receiver R1, R2, R3, a reference signal corresponding to the signal transmitted by transmitter T1 is generated from a localization frame 57, and another reference signal corresponding to the signal transmitted by transmitter T2 is generated from another localization frame 57. The reference signals respectively corresponding to the localization signals transmitted by transmitter T1 and by transmitter T2 are for example selected from the same frame as that which had been used to transmit the corresponding localization signal.

Each receiver R1, R2, R3 then calculates, in the corresponding block 151, 152, 153, the difference between the propagation time of the signal transmitted by transmitter T1 and the propagation time of the signal transmitted by transmitter T2.

Propagation time differences 161, 162, and 163, respectively obtained at the output of blocks 151, 152, and 153 of receivers R1, R2, R3, are sent to a calculation unit 165, for example, associated with transmitter T2, where the position (Loc) of object T1 is deduced by triangulation.

An advantage of a system for localizing an object of the type described in relation with FIG. 7 is that it enables localization of any object of a network of objects communicating together by radio transmission, provided for this object to be capable of transmitting a radio signal. The object to be localized is not necessarily equipped with a specific calculation unit.

Specific embodiments have been described in the present disclosure. Various alterations, modifications, and improvements will readily occur to those skilled in the art.

In particular, although a system for localizing an object using three radio receivers and two radio transmitters, one transmitter being assigned to the object to be localized, has been described, more than three radio receivers and more than two radio transmitters can be used.

Further, the triangulation may be performed in a calculation unit associated with an object of the network other than transmitter T2. The triangulation may be performed in a calculation unit external to the network.

Although the present embodiments have been described in the case where the localization signals are transmitted according to standard IEEE 802.15.4 (ZigBee), the present disclosure also applies to the case where the localization signals are transmitted by any other type of adapted modulated radio wave. In particular, the case where the localization signals are transmitted according to standard IEEE 802.11 (Wi-Fi).

Various embodiments with different variations have been described hereinabove. It should be noted that those skilled in the art may combine various elements (e.g., modules) of these various embodiments and variations. In particular, the practical implementation of the described embodiments is within the abilities of those skilled in the art based on the functional indications given hereinabove and by using tools usual per se.

Such alterations, modifications, and improvements are intended to be part of and within the spirit and the scope of the present disclosure. Accordingly, the foregoing description is by way of example only and is not intended to be limiting.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A method to localize an object, comprising:
   transmitting by a first transmitter assigned to the object a first signal from a first frame;

transmitting by at least one second transmitter a second signal from a second frame, wherein said first and second frames include a common portion;

receiving the first signal and the second signal by at least three receivers, each receiver performing, for the first signal and the second signal, acts of:

generating a first reference signal from a third frame and a second reference signal from a fourth frame, the third and fourth frames including said common portion;

performing a first correlation between the first signal and the first reference signal;

performing a second correlation between the second signal and the second reference signal;

interpolating samples resulting from the first and second correlations;

deducing propagation time of the first signal and propagation time of the second signal; and calculating a difference between the propagation times of the first signal and of the second signal; and deducing a position of the object by triangulation based on the differences between the propagation times of the first signal and the second signal.

2. The method of claim 1 wherein the act of interpolating includes comparing samples resulting from the first correlation with other samples resulting from an auto-correlation of the first reference signal or the act of interpolating includes comparing samples resulting from the second correlation with other samples resulting from an auto-correlation of the second reference signal.

3. The method of claim 1 wherein the third frame is selected according to the first frame and the fourth frame is selected according to the second frame.

4. The method of claim 3 wherein the third frame is identical to the first frame and the fourth frame is identical to the second frame.

5. The method of claim 1 wherein the triangulation is performed in a calculation unit associated with the second transmitter.

6. The method of claim 1 wherein the common portion of each frame corresponds to a data sequence represented in each frame.

7. A system to localize an object, comprising:
a first transmitter assigned to the object and configured to transmit a first signal from a first frame;
at least one second transmitter capable of transmitting a second signal from a second frame, wherein said first and second frames include a common portion;
at least three receivers, each receiver configured to receive the first and the second signal, each receiver comprising:
a first element configured to generate a first reference signal from a third frame and a second reference signal from a fourth frame, the third and fourth frames including said common portion;
a second element configured to calculate a first correlation between the first signal and the first reference signal, the second element configured to calculate a second correlation between the second signal and the second reference signal;
a third element configured to calculate an interpolation of samples resulting from the first correlation and an interpolation of samples resulting from the second correlation, the third element configured to deduce propagation time of the first signal and propagation time of the second signal; and a fourth element configured to calculate a difference between the propagation times of the first signal and of the second signal; and a calculation unit configured to receive from each receiver the difference between the propagation times of the first signal and of the second signal, the calculation unit configured to deduce a position of the object by triangulation based on the differences between the propagation times of the first signal and of the second signal calculated by each receiver.

8. The system of claim 7 wherein, for each receiver, the third element comprises:
a fifth element configured to calculate an auto-correlation of the first reference signal corresponding to the first signal, the fifth element configured to calculate an auto-correlation of the second reference signal corresponding to the second signal;
a sixth element configured to calculate an interpolation of samples resulting from the auto-correlation of the first reference signal and of samples resulting from the auto-correlation of the second reference signal; and
a seventh element configured to compare, for the first signal and the second signal respectively, samples resulting from the first correlation and the second correlation calculated in the second element and samples resulting from the interpolation calculated in the sixth element.

9. The system of claim 7 wherein the calculation unit configured to deduce the position of the object is associated with the second transmitter.

10. A receiver to localize an object, comprising:
a demodulator arranged to pass a first signal from a first transmitter, the first transmitter associated with an object, the demodulator arranged to pass a second signal from a second transmitter, the first signal and the second signal having a common portion;
a first module configured to generate a first reference signal and a second reference signal, the first reference signal and the second reference signal having a common reference portion
a second module configured to calculate a first correlation between the first signal and the first reference signal, the second module configured to calculate a second correlation between the second signal and the second reference signal;
a third module configured to calculate an interpolation of first correlation samples and second correlation samples passed from the second module;
a fourth module configured to deduce propagation time of the first signal and propagation time of the second signal based on the interpolation from the third module;
a fifth module configured to calculate a difference between the propagation time of the first signal and the propagation time of the second signal; and
a calculation module configured to:
receive the difference between the propagation time of the first signal and the propagation time of the second signal;
receive a second difference between the propagation time of the first signal and the propagation time of the second signal generated by a second receiver;
receive a third difference between the propagation time of the first signal and the propagation time of the second signal generated by a third receiver; and
deduce a position of the object by triangulation based on the difference, the second difference, and the third difference.

11. The receiver of claim 10 wherein the receiver is configured to receive the first and second signals from the first and second transmitters, the first and second transmitters being remote from each other and remote from the receiver.

12. The receiver of claim 10 wherein the receiver is configured to receive the second and the third differences from the second and third receivers, the second and third receivers being remote from each other and remote from the receiver.

13. The receiver of claim 10 wherein the common portion and the common reference portion are not identical.

14. The receiver of claim 10, comprising:
an antenna configured to receive an analog signal having the first signal modulated thereon;
an amplifier configured to amplify the analog signal;
a carrier frequency input to the demodulator arranged to receive a carrier frequency, the demodulator configured to separate, using the carrier frequency, an envelope having the first signal from the analog signal; and
an analog to digital converter circuit arranged to retrieve the first signal from the envelope.

15. The receiver of claim 10 wherein the third module comprises:
a sixth module configured to calculate an auto-correlation of the first reference signal and an auto-correlation of the second reference signal;
a seventh module configured to calculate an interpolation of samples resulting from the auto-correlation of the first reference signal and of samples resulting from the auto-correlation of the second reference signal; and
an eighth module configured to compare, for the first signal, samples resulting from the first correlation calculated in the second module and samples resulting from the interpolation calculated in the seventh module, the eighth module configured to compare, for the second signal, samples resulting from the second correlation calculated in the second module and samples resulting from the interpolation calculated in the seventh module.

16. The receiver of claim 15 wherein the second module and the third module are configured to perform the first correlation and the auto-correlation of the first reference signal concurrently.

17. The receiver of claim 15 wherein the second module and the third module are configured are configured to perform their respective calculations with a same calculation unit.

18. The receiver of claim 10 wherein the second module comprises:
a ninth module configured to calculate an offset between a first carrier frequency and a second carrier frequency, the first carrier frequency arranged to modulate an analog signal having the first signal therein, the second carrier frequency arranged to demodulate the analog signal having the first signal therein.

19. The receiver of claim 10 wherein the second difference and the third difference are received by respective radio transmissions from the second receiver and the third receiver.

20. The receiver of claim 10 wherein the receiver conforms to a ZigBee wireless communication protocol.

21. A method to localize an object, comprising:
receiving a first signal and a second signal by at least three receivers, the first and second signals having a common portion, each receiver performing, for the first signal and the second signal, acts of:
generating a first reference signal from one frame and a second reference signal from another frame, the two frames including said common portion;
performing a first correlation between the first signal and the first reference signal;
performing a second correlation between the second signal and the second reference signal;
interpolating samples from the first and second correlations;
deducing propagation time of the first signal and propagation time of the second signal; and
calculating a difference between propagation times of the first signal and of the second signal; and
deducing a position of the object based on the differences between the propagation times of the first signal and the second signal.

22. The method of claim 21 wherein the act of interpolating includes comparing samples resulting from the first correlation with other samples resulting from an auto-correlation of the first reference signal or the act of interpolating includes comparing samples resulting from the second correlation with other samples resulting from an auto-correlation of the second reference signal.

23. The method of claim 21 wherein deducing the position of the object includes at least one act of triangulation.

24. The method of claim 21 wherein the common portion of each frame corresponds to a data sequence represented in each frame.

25. A receiver to localize an object, comprising:
a demodulator arranged to pass a first signal and a second signal, the first signal and the second signal having a common portion;
a first module configured to generate a first reference signal and a second reference signal, the first reference signal and the second reference signal having a common reference portion;
a second module configured to calculate a first correlation between the first signal and the first reference signal, the second module configured to calculate a second correlation between the second signal and the second reference signal;
a third module configured to calculate an interpolation of first correlation samples and second correlation samples passed from the second module;
a fourth module configured to deduce propagation time of the first signal and propagation time of the second signal based on the interpolation from the third module; and
a calculation module configured to deduce a position of the object based on a difference between propagation times of the first and second signals calculated by the receiver and by at least two other receivers.

26. The receiver of claim 25 wherein the receiver is configured to receive the first and second signals from first and second transmitters, the first and second transmitters being remote from each other and remote from the receiver.

27. The receiver of claim 25 wherein the receiver conforms to a ZigBee wireless communication protocol.

* * * * *